United States Patent
Ejderholm et al.

(10) Patent No.: US 10,028,067 B2
(45) Date of Patent: Jul. 17, 2018

(54) INDICATOR DEVICE FOR A HEARING LOOP

(71) Applicant: AB TRANSISTOR SWEDEN, Sollentuna (SE)

(72) Inventors: Henrik Ejderholm, Stockholm (SE); Johan Hammarstrom, Upplands Vasby (SE); Carl Ronn, Stockholm (SE)

(73) Assignee: AB TRANSISTOR SWEDEN, Sollentuna (SE)

( * ) Notice: Subject to any disclaimer, the term of this patent is extended or adjusted under 35 U.S.C. 154(b) by 0 days.

(21) Appl. No.: 15/560,539

(22) PCT Filed: Mar. 18, 2016

(86) PCT No.: PCT/SE2016/050228
§ 371 (c)(1),
(2) Date: Sep. 22, 2017

(87) PCT Pub. No.: WO2016/153414
PCT Pub. Date: Sep. 29, 2016

(65) Prior Publication Data
US 2018/0115845 A1 Apr. 26, 2018

(30) Foreign Application Priority Data
Mar. 24, 2015 (SE) ........................ 1550355

(51) Int. Cl.
*H04R 25/00* (2006.01)
*H04R 27/02* (2006.01)
*H04R 29/00* (2006.01)

(52) U.S. Cl.
CPC ........... *H04R 27/02* (2013.01); *H04R 29/007* (2013.01); *H04R 29/008* (2013.01)

(58) Field of Classification Search
USPC ... 381/60, 115, 172, 57, 312, 315, 330, 331, 381/58, 396, 321
See application file for complete search history.

(56) References Cited

U.S. PATENT DOCUMENTS

| | | | |
|---|---|---|---|
| 7,397,926 B1 * | 7/2008 | Frerking | H04M 1/6066 381/315 |
| 2014/0266939 A1 * | 9/2014 | Baringer | H01Q 21/28 343/729 |

FOREIGN PATENT DOCUMENTS

| | | |
|---|---|---|
| EP | 2 824 900 A1 | 1/2015 |
| EP | 2 892 249 A1 | 7/2015 |
| GB | 2 500 286 A | 9/2013 |

OTHER PUBLICATIONS

International Search Report, dated Jun. 7, 2016, from corresponding PCT/SE2016/050228 application.

* cited by examiner

Primary Examiner — Yosef K Laekemariam
(74) Attorney, Agent, or Firm — Young & Thompson

(57) ABSTRACT

Indicator device for a hearing loop, arranged to be permanently installed at a location from which it is clearly visible for a user of the hearing loop during such use. The indicator device includes a minimum magnetic field setting unit, a hearing loop detection unit arranged to measure the current field strength of a magnetic field produced by the hearing loop, an interpretation device arranged to translate the detected field strength, in relation to the minimum field strength, to produce a corresponding current relative intensity signal, as well as a variable display unit arranged to display a visible signal indicating the value of the current intensity signal.

20 Claims, 3 Drawing Sheets

INDICATOR DEVICE FOR A HEARING LOOP

The present invention relates to an indicator device for a hearing loop, and to a method for installing and configuring such an indicator device.

Audio induction loops, or hearing induction loops, are installed in many public spaces, in order to achieve accessibility for hearing impaired persons. Such a hearing loop is typically permanently installed in or along the walls of a particular room, producing a magnetic field the fluctuations of which carry information concerning a particular sound, such as the sound captured by a microphone somewhere in the room or a pre-recorded sound clip.

The magnetic field can be picked up by a so-called telecoil which is built into a compatible hearing aid, cochlear implant or the like, for playback into the ear of the hearing impaired person. Since the sound is transferred directly to the hearing aid, the signal to noise ratio is maximized, improving the speech intelligibility.

Hearing loops must be properly calibrated, together with any sound-processing equipment such as an amplifier and for the particular space in which it is present. There is, for instance, a standard IEC61818-4 for achieving a correlating sound level in the hearing aid, according to which correct calibration of the hearing loop equipment is required but also correct usage of any peripheral equipment. The calibration aims at providing adequate signal strength at locations in the said space at which hearing aids are usually to be used, such as about 1.5 meters from the floor and away from any side walls. A calibrated hearing loop will then provide a magnetic field that varies across the served space. Since the total installation typically includes not only the hearing loop, but also at least one, often several pieces of equipment for sound capture and/or generation, and since several persons typically have access to setting various volume controls or the like for such equipment, a set calibration is however frequently modified during usage.

For a person talking into a microphone, there is no easy way to know whether each hearing impaired person has a clear speech reception. In particular, the hearing impaired are often in minority, and it is not easily seen which persons in the audience that have hearing aids, in particular from a certain distance. Also, in case some persons cannot hear the sound correctly, it is difficult to know whether the hearing loop is poorly calibrated or if the individual hearing aids are set incorrectly in terms of volume, listening program, etc. Another possibility is that the speaker is too far from the microphone. As a result, hearing loops are often perceived as not very reliable.

In order to verify the function of the hearing loop, it is possible to use a hearing aid with a telecoil to test the functionality, or to measure the magnetic field with a particular type of measuring equipment, for instance marketed by the company Ampetronic®. Such instruments are typically intended for use at a specific measurement location, which should be at a prescribed location within the said space, such as at a particular height above the floor in a room. A technician will then typically read an absolute value of the signal strength at this particular location to see whether the hearing loop is properly configured in the space.

GB 2476675 A discloses a screen equipped with a hearing loop, in which there is also a static information sign indicating the presence of the hearing loop. Such static signs are, as such, conventional, and are frequently placed in public spaces equipped with hearing loops.

The present invention solves the above described problems, and in particular provides a way to increase the reliability of an installed hearing loop system.

Hence, the invention relates to an indicator device for a hearing loop, arranged to be permanently installed at a location from which it is clearly visible for a user of the hearing loop during such use, and is characterised in that the indicator device comprises a setting means for setting a minimum field strength, a hearing loop detection means arranged to measure the current field strength of a magnetic field produced by the hearing loop, an interpretation device arranged to translate the detected field strength, in relation to the said minimum field strength, to produce a corresponding current relative intensity signal, as well as a variable display means arranged to display a visible signal indicating the value of the current intensity signal.

Furthermore, the invention relates to a method for installing and configuring an indicator device according to any one of the preceding claims in a space in which a hearing loop system is installed, which method is characterised in that the method comprises the steps a) calibrating the field strength of a hearing loop so that it provides adequate field strength at a particular location in the space when particular sound information is relayed via the hearing loop system, and permanently installing the indicator device at another location in the space; and b) setting a minimum field strength of the indicator device, using a setting means of the indicator device, so that a visible signal emitted by the indicator device signals an adequate field strength when the said particular sound information is relayed via the hearing loop system and picked up by a hearing loop detection means of the indicator device.

In the following, the invention will be described in detail, with reference to exemplifying embodiments of the invention and to the enclosed drawings, in which.

All figures share the same reference numerals for same parts.

Figure 1:
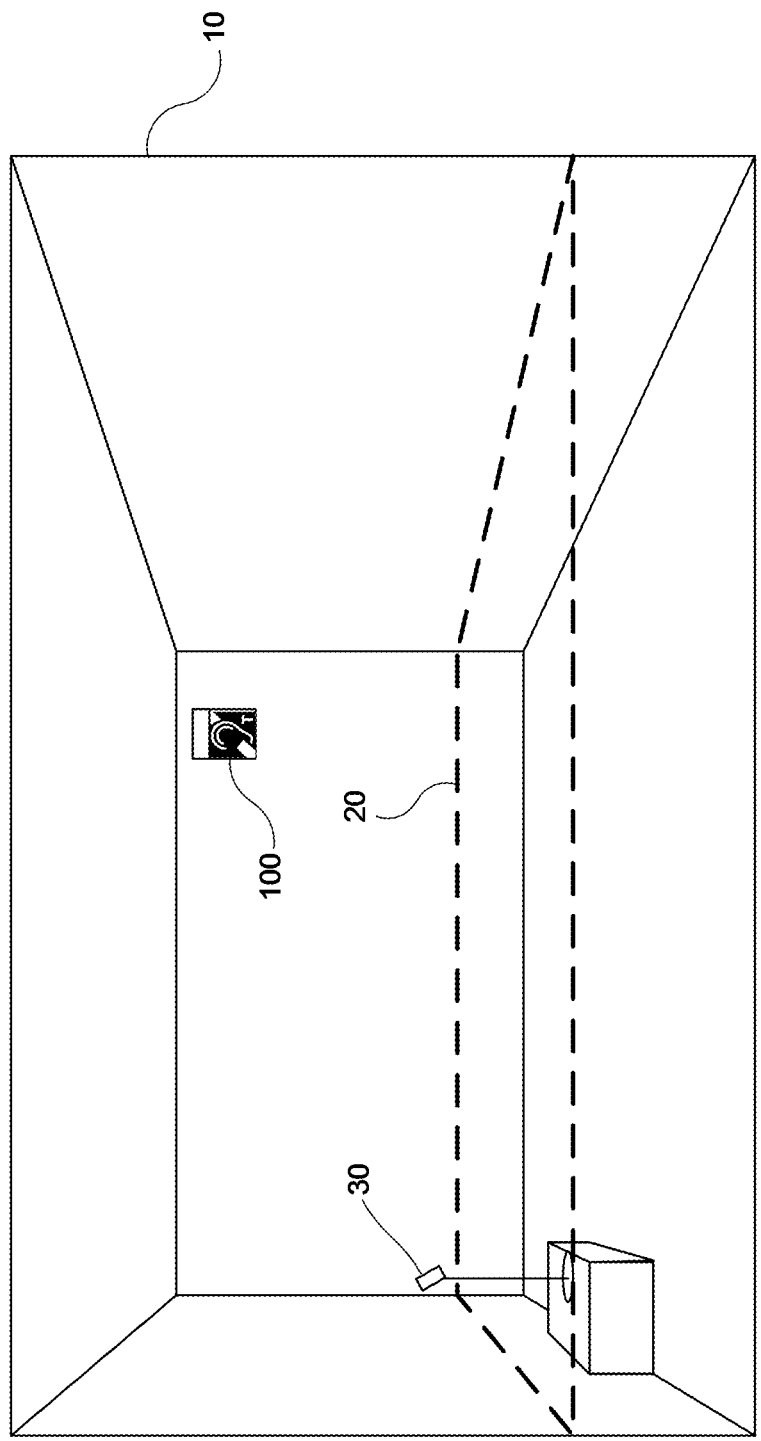
FIG. 1 shows a public space comprising a hearing induction loop and an indicator device according to the present invention.

FIG. 1 illustrates an indicator device 100 according to the invention for a hearing induction loop 20, which loop is indicated using broken lines. The hearing loop 20 is installed in a public space 10, such as a conference room, in which a microphone 30 is installed in connection to the hearing loop 20, in a way such that the sound captured by the microphone 30 is broadcast via the hearing loop 20 in a manner which is conventional as such. It is realized that FIG. 1 only shows an exemplifying setup using a hearing loop; any other use of such a hearing loop 20 is useful with the present invention; such as connecting the loop 20 to a sound system for playback of sound, and so forth.

The indicator device 100 is arranged to be permanently installed, it is preferably in fact permanently installed, at a location from which it is clearly visible to a user of the hearing loop 20 during such use. Hence, a hearing-aid-carrying user, listening via the hearing loop 20, can for instance clearly see and interpret the information on the indicator device 100 when present somewhere in at least parts of the coverage zone of the hearing loop 20. Preferably, a user of the microphone 30 or an operator of the hearing loop 20 system can also see the indicator device 100 during use, in a corresponding way. Also, the indicator device 100 is arranged to be permanently installed, or preferably in fact installed, within the coverage area of the magnetic field produced by the hearing loop 20, preferably on a side wall of the public space 10 or in a ceiling of the public space 10 close to such a side wall, such as maximally 1 meter from a side wall.

Figure 2:
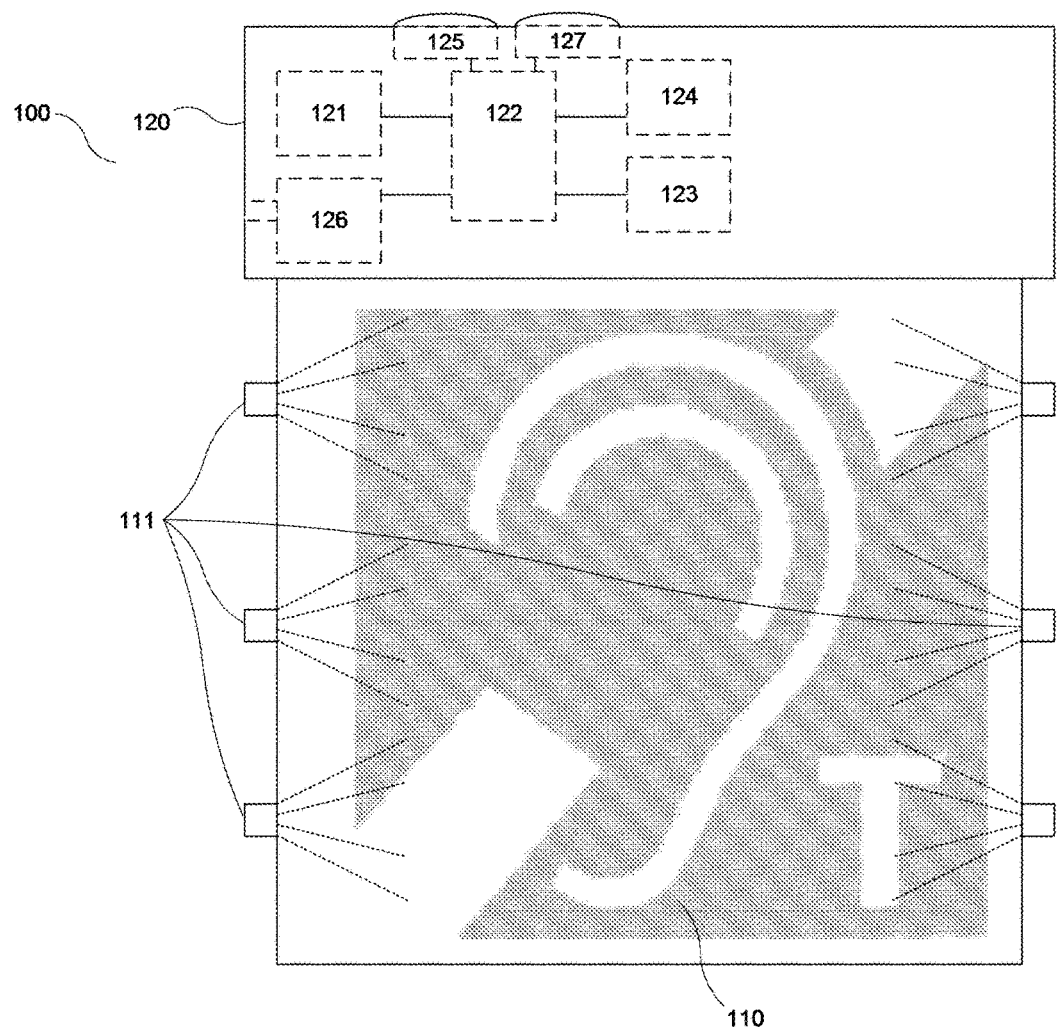
FIG. 2 illustrates, in a simplified diagram, an indicator device according to the invention.

FIG. 2 illustrates a more detailed yet still schematic view of an indicator device 100 according to the present invention. According to the invention, the indicator device 100 comprises a setting means 127 for setting a minimum field strength, a hearing loop detection or measurement means 121, arranged to measure the current field strength of a magnetic field generated by the hearing loop 20 and present at the location where the indicator device 100 is installed, which magnetic field constitutes a magnetic field signal that carries sound information. Furthermore, the indicator device 100 comprises an interpretation device 122, arranged to translate the detected field strength, in relation to the minimum field strength, to produce a corresponding current relative intensity signal. Hence, the measured field strength as delivered to the interpretation device 122 from the detection means 121 is compared or related to said set minimum field strength value, and the current relative intensity signal is expressed in relation thereto. The indicator device 100 also comprises a variable display means 110, arranged to display a visible signal indicating the current value of the said relative intensity signal.

It is realized that the entities 121, 122 and 127, as well as any or all of entities 123, 124, 125 and 126 (described below) may constitute integrated parts, and/or logical parts, of one and the same entity, or may be arranged as separate entities, in any suitable combination. Connections (logical and/or physical) between various parts of the indicator device 100 are indicated by lines in FIG. 2.

That the relative intensity signal is "translated from the detected field strength in relation to the minimum field strength" means that the resulting relative intensity signal depends upon both the detected field strength and the minimum field strength, set using means 127, in some way. Examples comprise that the intensity signal is, or is calculated based upon, the difference between the detected field strength and the minimum field strength; and that the relative intensity signal is a first value in case the detected field strength is higher than the minimum field strength, and a second, different, value otherwise.

It is realized that the "intensity signal" is a representation of some sort of the magnetic field present in the space 10, and hence of the sound captured by the microphone 30. In some embodiments, it may be a representation of the instantaneously measured magnetic field;
a time average of the magnetic field measured during a certain lapsed time period; and so on. What is important is that it is a representation of the "current" magnetic field in the space 10. Herein, the term "current" in this context is to be interpreted to be a measure of the magnetic field during not longer than the past 30 seconds, preferably the past 10 seconds, possibly the instantaneous magnetic field.

The detection means 121 comprises a sensor, such as one or several telecoils, for instance one or several telecoils. Said sensor is preferably arranged to continuously, or at least intermittently, measure the instantaneous magnetic field strength present at the location of the indicator device 100, as generated by the hearing loop 20, and to feed the above discussed field strength signal to the interpretation device 122 representing the measured value of the field strength, in the form of an instantaneous measurement value or an averaged value of the measured field strength across several measurement points.

It is realized that the magnetic field strength can be measured by the detection means 121 instantaneously or over a certain small time interval, such as up to one second, in order to produce a respective measurement point.

The interpretation device 122 is preferably arranged to read the said field strength signal and to control the display means 110 by sending the said relative intensity signal to the said display means 110, which in turn displays the said visible signal based upon the received relative intensity signal.

The interpretation device 122 hence performed logic processing, which may be implemented in a suitable way in a combination of hardware and software. Hence, the interpretation device 122 may comprise a circuit board with a processor, a memory module, communication interfaces, etc.

Such an indicator device 100 can hence be installed permanently almost anywhere in the room 10 and, in realtime, near realtime (involving a short delay of maximally 10, preferably 5 seconds) or intermittently provide feedback to a user of the microphone 30 (or similar) regarding the current field strength of the generated hearing loop field. As a result, the said user can use this fed back information to, for instance, immediately detect that no sound is sent over the hearing loop due to some technical problem, or understand that an adjustment is needed of the distance between his or her mouth to the microphone during speech, in order to provide a pleasant hearing volume for hearing impaired listeners. Also, hearing aid users can use the displayed information in order to know whether a hearing problem is due to the hearing loop providing inadequate field strength or due to a local problem with the hearing aid. Since the current value of the intensity signal is displayed, which is calculated by the interpretation means 122 based upon the measured current value of the magnetic field strength, the information visually displayed to such users is also current, preferably reflecting the current status of the magnetic field strength in realtime or near realtime, and in relation to said minimum field strength, any problems will be visually detected immediately, making it possible to identify and solve any accrued problems with as little delay and problems as possible.

According to a preferred embodiment, the visible signal is a light signal, whereby the colour of the emitted light indicates the said current measured field strength in relation to said set minimum field strength. In FIG. 2, the variable display means 110 comprises a graphical symbol, in the case illustrated a standard symbol indicating the presence of a hearing loop, the light intensity and/or colour of which may be changed so as to indicate the relative value of the current field strength. One example of this is that the brightness and/or colour of the symbol is varied, such as along a continuous scale, in relation to the current relative field strength. Another example is that the colour of the symbol is varied step-wise depending on the current relative field strength, for instance according to the following scheme:
Blinking green light—hearing loop magnetic field currently too weak
Steady green light—hearing loop magnetic field currently balanced (within allowable interval)
Steady red light—hearing loop magnetic field currently too strong In this example, a predetermined or set maximum field strength is also used, in a way corresponding to the use of the above described minimum field strength, in order to warn for too strong hearing loop fields. The maximum field strength may be set using a maximum field strength setting means corresponding to the above described minimum field strength setting means.

This example also serves to illustrate a preferred embodiment, according to which the visible signal in a binary fashion indicates whether or not the measured field strength is below the minimum field strength. "Binary" in this context refers to an "on/off" type of signalling, in which for instance blinking green indicates "lower than minimum field strength" and "steady green" indicates "not lower than minimum field strength". Of course, it is possible to instead of blinking/steady use, for instance, different colours.

Correspondingly, it is also preferred that the visible signal in a binary fashion indicates whether or not the measured field strength is above the said maximum field strength. Preferably, the interpretation device 122 is arranged to distinguish between a magnetic field state which is "acceptable" (such as signalled using steady green light above, when the current magnetic field is within the allowable interval) and one or several states which are "unacceptable" (such as signalled using blinking green or steady red light above, when the current magnetic field is outside of said allowable interval). Then, the interpretation device is arranged with filter functionality for changing the intensity signal which is fed to the display means 110 from one such acceptable or unacceptable state to another one, in the described binary fashion. In this case, it is preferable that the filter functionality is designed so that a time period which is required for the current magnetic field value to be outside of the allowed interval before the interpretation device 122 changes the intensity signal from an acceptable state to the corresponding unacceptable state is longer than a time period which is required for the current magnetic field value to be inside of the allowable interval before the interpretation device 122 changes the intensity signal from an unacceptable state to the corresponding acceptable state.

In other words, the interpretation device 122 is arranged to distinguish between a detected magnetic field strength which is within an acceptable interval and a detected magnetic field strength which is unacceptable; the possible intensity signals comprise a first signal representing said acceptable state and a different, second signal representing said unacceptable state; the interpretation device 122 is arranged to change the intensity signal from the first signal to the second signal after a first time period during which the detected magnetic field strength is within said unacceptable interval and to change the intensity signal from the second signal to the first signal after a second time period during which the detected magnetic field strength is within said acceptable interval; and the said first time period is longer than the said second time period.

As used herein, the term "allowable interval" means above the minimum field strength and, as applicable, below any maximum field strength.

Preferably, the first time period is at least 5 times longer than the second time period.

This provides superior feedback to users of the system, in particular to a person trying to be heard adequately by all persons in an audience.

It is also preferred that the interpretation device 122 is arranged with a lower current magnetic field value threshold, so that a current magnetic field value which is lower than the said threshold is interpreted as zero magnetic field. This provides a more accurate interpretation of the usage of the hearing loop 20, in particular when used for conveying speech sounds. The lower current magnetic field value threshold may be predetermined, settable using a separate setting means (not shown in the figures) or be calculated based upon the set minimum field strength, for instance as a percentage of this value.

When the current magnetic field signal has been zero for a certain predetermined time period, the interpretation device 122 may be arranged to feed a signal to the display means 110 resulting in that the display means 110 switches off a light. Alternatively, in this case the interpretation device 110 is arranged to feed a signal to the display means 110 indicating whether or not a current magnetic field has been detected by the detection means 121 anytime during a certain predetermined lapsed time period, such as the previous 12 or 24 hours.

Preferably, the indicator device is programmable by a user, in the sense that one of several different display modes can be selected, such as using a conventional dip switch control. It is, in this case, preferred that said display modes comprise different combinations of time periods for binary switching between different acceptable/unacceptable states, as described above. Different such display modes may also feature different types of signals when the current magnetic field is zero, as discussed above.

One preferred way of achieving such a variable display is that the light signal is emitted by at least one light source 111, such as a series of LED light sources, illuminating a transparent sheet, for instance a plastic or glass sheet, from its side. Then the sheet comprises said symbol indicating the presence of a hearing loop installation, for instance by being etched into the sheet material surface. The light sources may be driven by a driving means 123, for instance comprising light source driving electronics and a power source, such as a battery pack or a power input from an external voltage source. The driving means 123 receives driving instructions from the interpretation device 122.

Furthermore, according to a preferred embodiment, the indicator device 100 further comprises an ambient light sensor 124, arranged to detect the ambient light intensity in the room 10, and to cause the display means 110, preferably via the driving means 123, to adapt the intensity of the emitted light signal in response to a change in the ambient light intensity, preferably by increasing the light intensity in response to an increased general ambient light intensity and/or to adjust the light intensity level depending on an absolute value of a measured ambient light intensity in the room 10.

According to another preferred embodiment, the indicator device 100 further comprises a light intensity setting device 125, such as an illustrated mechanical wheel control, arranged to receive a manual input from a user and to cause the display means 110, preferably via driving means 123, to adapt the intensity of the emitted light signal in response to said manual input. It is possible to have both such a manual control 125 and an automatic control 123, for instance by setting a general light intensity level using device 125 and using means 123 to continuously adjust the light intensity level, based upon the said general level, in response to fluctuations in the measured ambient light.

Preferably, the visible signal is updated in realtime, or at least intermittently at least every 10 seconds, possibly at a delay, as a result of an averaging function implemented by the hearing loop detection means, of maximally 30 seconds, preferably 5 seconds.

According to one preferred embodiment, the interpretation device 122 is arranged to, over a predetermined time period, measure, using for instance the detection means 121, the average field strength of the magnetic field. Such measurement should be performed over at least several days, and preferably over several weeks. The said average field intensity is preferably compared to an allowable interval for the average field strength, which interval comprises a lower limit and which may also comprise a higher limit. In case the measured average field strength is outside of the allowable interval, the display means 110 is caused to display a warning signal, such as displaying the said symbol using blinking red light. Preferably, a daily and/or weekly variation is identified, using suitable statistics software executed by the interpretation device 122, and such identified variation is taken into consideration when determining whether or not the measured average field strength is within the allowable interval. Also, the indicator device 100 in this case preferably comprises a reset means (not shown in FIG. 2), arranged to reset the measurement of the average field strength when activated, hence causing the measurement to begin anew and also causing the said warning signal no longer to be displayed.

Figure 3:
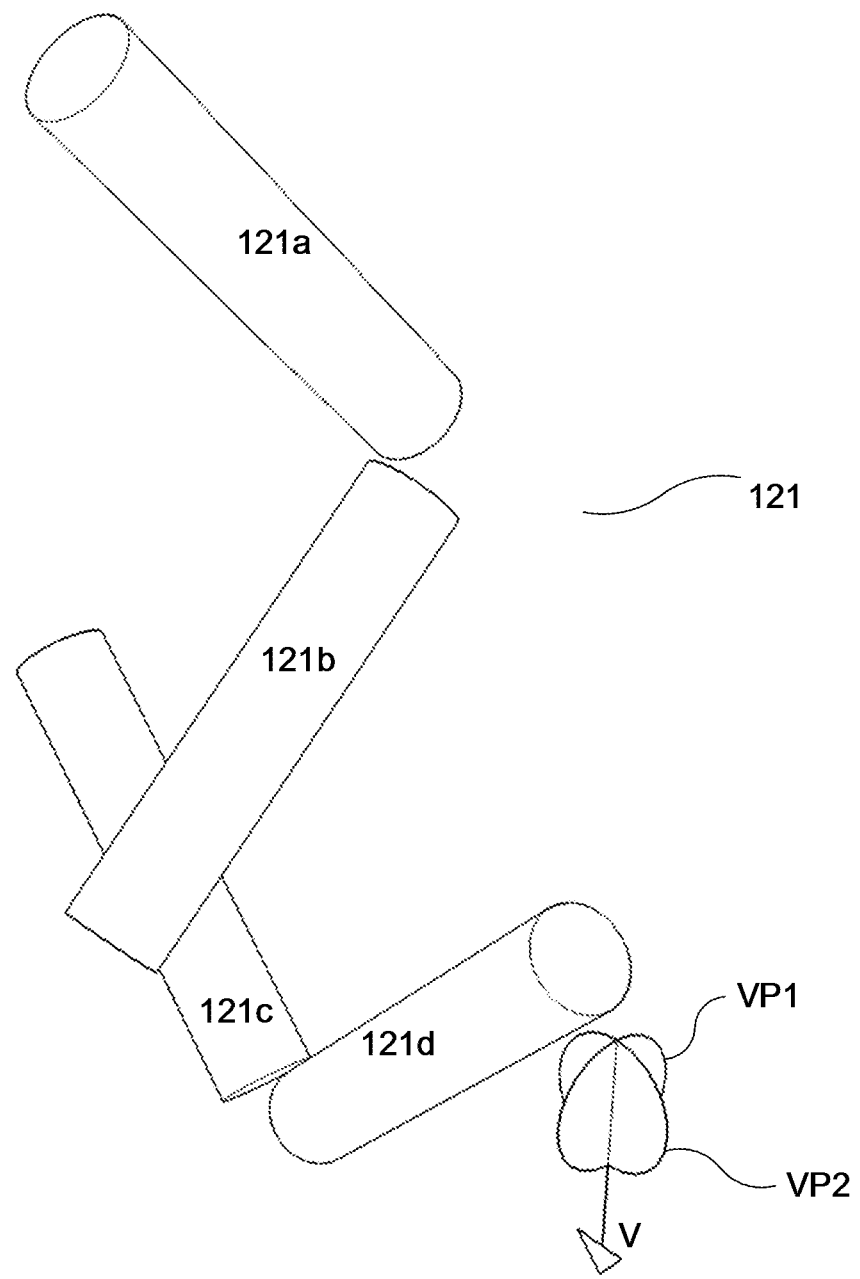
FIG. 3 illustrates, schematically, a loop detection means according to the invention.

FIG. 3 illustrates an internal structure of the loop detection means 121 described above, according to a preferred embodiment. The illustration is made in a highly simplified and idealized fashion, in which only a number of telecoils 121a, 121b, 121c, 121d are illustrated as cylinders, without any cabling, driving electronics and so forth. The hearing loop detection means 121 preferably comprises two telecoils 121a, 121b, with their respective main longitudinal axis offset by substantially 90° in relation to each other and both being arranged so that their respective main longitudinal axis is arranged substantially in a first vertical plane VP1 when the indicator device 100 is permanently installed at the said location in the room 10.

Preferably, the hearing loop detection means 121 further comprises two additional telecoils 121c, 121d, with their respective main longitudinal axis offset by substantially 90° in relation to each other and both being arranged so that their respective main longitudinal axis is arranged substantially in a second vertical plane VP2 when the indicator device 121 is permanently installed at said location in the room 10. The second vertical plane VP2 is preferably perpendicular to the first vertical plane VP1, as illustrated in FIG. 3. Preferably, one of said vertical planes VP1, VP2 is substantially parallel to a surface to which the indicator device 100 is fastened in the space 10 when installed therein.

The letter "V" in FIG. 3 denotes the vertical direction downwards.

Preferably, the strongest signal from any one of said telecoils 121a, 121b or 121a, 121b, 121c, 121d, as the case may be, is selected and used as the basis for the detected field strength. This guarantees that a relevant signal is captured even if the indicator device 100 is mounted in the ceiling, or mounted perpendicular to a main wall in the space 10. Hearing loop systems are typically not optimised for magnetic fields originating strength from vertically above or below a hearing loop 10. In particular, this way the indicator device 100 becomes capable to detect, with sufficient accuracy, a hearing loop 20 magnetic field originating substantially vertically from above or below the indicator device 100, which is preferred.

According to a further preferred embodiment, the indicator device 100 comprises a telecoil signal input means 126, arranged to receive a signal representing a current reading from a peripherally arranged telecoil. The input means 126 may, as illustrated in FIG. 2, comprise a jack, such as a conventional RCA jack or a teleplug, or may be a wireless input means, such as a Bluethooth®, WiFi or 3G transceiver, or the like, arranged to receive such a signal. Then, the indicator device 100 is arranged to allow the strength of the signal received by input means 126 to be used instead of the said measured magnetic field strength. This way, the indicator device 100 may be used for instance for controlling purposes, providing visual feedback, even if the indicator device 100 is not actually installed in the space 10 in which the hearing loop 20 is arranged. In case a wireless input means 126 is used, it is preferred that a user of the indicator device 100 can select one of a plurality of external telecoil devices the signal of which is to be used as the current value of the magnetic field. This way, one single indicator device 100 may be used to cover a larger space 10, by selecting a peripheral telecoil device which is located in a part of the space 10 in which the magnetic field is to be measured. Preferably, such peripheral telecoil devices are constructed as illustrated in FIG. 3, an additionally comprise a suitable sending means arranged to communicate with the input means 126.

In case the signal input means 126 is arranged to receive an electric signal, it is preferred that the signal is balanced, in particular to use a balanced signal in combination with a tele plug.

Preferably, the indicator device 100 is configured during installation against a normal magnetic field strength value, which is specific to the particular location within the public space 10 at which the indicator device 100 is installed, preferably by direct measurement, preferably using the indicator device 100 itself.

According to the invention, the indicator device 100 is installed using the following method steps:
a) Calibrating the field strength of the hearing loop so that it provides adequate field strength at a particular location in the space 10, such as where a hearing aid will be present during use, such as at a certain distance from the floor and away a certain distance from the nearest side wall, which adequate field strength is provided when particular sound information is relayed via the hearing loop system; and permanently installing the indicator device 100 at another location in the space 10, hence not at a place which is measured during the course of said calibration.
b) Setting the minimum field strength of the indicator device 100, using setting means 127, so that the visible signal emitted by the indicator device 100 signals an adequate field strength when said particular sound information is relayed via the hearing loop 10 system. Preferably, a maximum field strength (as described above) is also set, in a corresponding fashion, using a corresponding setting means.

This way, an indicator device 100 according to the present invention can be quickly and easily installed to provide satisfactory performance for any type of said particular sound information, such as for instance speech captured by the microphone 30.

All "setting means" described herein can be implemented as control devices that are conventional as such, for instance as simple potentiometric controls.

Above, preferred embodiments have been described. However, it is apparent to the skilled person that many modifications may be made to the described embodiments without departing from the basic idea of the invention.

For instance, the display means 110 may be any conventional variable display means capable of displaying a varying signal for communicating the current relative intensity, such as a simple lamp connected to a variable voltage driving circuit. There may be more telecoils than the ones illustrated in FIG. 3. The device 100 may be simply put on a table to or the like, as long as it is present within the public space 10.

The installation method described above may, of course, also comprise other steps, such as a corresponding setting step for setting a suitable value for a maximum field strength.

The skilled person realizes that there are numerous other possible modifications to be made to the device 100 described above.

Hence, the invention is not limited to the disclosed embodiments, but may be varied across the full scope of the enclosed claims.

The invention claimed is:

1. Indicator device (100) for a hearing loop (20), arranged to be permanently installed at a location from which it is clearly visible for a user of the hearing loop (20) during such use, which indicator device (100) comprises a hearing loop detection means (121) arranged to measure the current field strength of a magnetic field produced by the hearing loop (20), wherein the indicator device (100) comprises a setting means (127) for setting a certain field strength, an interpretation device (122) arranged to translate the detected field strength, in relation to the said minimum field strength, to produce a corresponding current relative intensity signal, as well as a variable display means (110) arranged to display a visible signal indicating the value of the current intensity signal, wherein the interpretation device (122) is arranged to distinguish between a detected magnetic field strength which is within an acceptable interval and a detected magnetic field strength which is unacceptable, wherein the intensity signal can be a first signal representing said acceptable state or a second signal representing said unacceptable state, wherein the interpretation device (122) is arranged to change the intensity signal from the first signal to the second signal after a first time period during which the detected magnetic field strength is within said unacceptable interval, wherein the interpretation device (122) is arranged to change the intensity signal from the second signal to the first signal after a second time period during which the detected magnetic field strength is within said acceptable interval, and wherein the said first time period is longer than the said second time period.

2. Indicator device (100) according to claim 1, wherein the visible signal is a light signal, wherein the colour of the emitted light indicates the measured field strength in relation to the said certain field strength.

3. Indicator device (100) according to claim 2, wherein the light signal is emitted by at least one light source (111) illuminating a transparent sheet from its side, which sheet comprises a symbol indicating the presence of a hearing loop installation.

4. Indicator device (100) according to claim 2, wherein the indicator device (100) further comprises an ambient light sensor (124), arranged to detect the ambient light intensity and to cause the display means (110) to adapt the intensity of the emitted light signal in response to a change in the ambient light intensity.

5. Indicator device (100) according to claim 2, wherein the indicator device (100) further comprises a light intensity setting device (125), arranged to receive a manual input from a user and to cause the display means (110) to adapt the intensity of the emitted light signal in response to said manual input.

6. Indicator device (100) according to claim 1, wherein the visible signal in a binary fashion indicates whether or not the measured field strength is below the said certain field strength.

7. Indicator device (100) according to claim 6, wherein the visible signal in a binary fashion also indicates whether or not the measured field strength is above a certain second field strength.

8. Indicator device (100) according to claim 1, wherein the visible signal is updated in realtime, or at least intermittently at least every 10 seconds.

9. Indicator device (100) according to claim 8, wherein the visible signal is updated at a delay, as a result of an averaging function implemented by the hearing loop detection means (121), which delay is maximally 10 seconds.

10. Indicator device (100) according to claim 1, wherein the interpretation device (122) is arranged to, over a predetermined time period, measure the average field strength of the magnetic field and to compare it to an allowable interval for the average field strength, and to cause the display means (110) to display a warning signal if the measured average field strength is outside the allowable interval.

11. Indicator device (100) according to claim 1, wherein the hearing loop detection means (121) comprises two telecoils (121a,121b), with their respective main longitudinal axis offset by substantially 90° in relation to each other and both being arranged so that their respective main longitudinal axis is arranged substantially in a first vertical plane (VP1) when the indicator device (100) is permanently installed at said location.

12. Indicator device (100) according to claim 11, wherein the hearing loop detection means further comprises two additional telecoils (121c,121d), with their respective main longitudinal axis offset by substantially 90° in relation to each other and both being arranged so that their respective main longitudinal axis is arranged substantially in a second vertical plane (VP2) when the indicator device (100) is permanently installed at said location.

13. Indicator device (100) according to claim 11, wherein the strongest signal from any one of said telecoils (121a, 121b,121c,121d) is selected and used as the basis for the detected field strength.

14. Indicator device (100) according claim 1, wherein the indicator device (100) further comprises a signal input means (126), arranged to receive a signal representing a current intensity value, and wherein the indicator device (100) is arranged to allow said received signal to be used instead of the said measured magnetic field strength.

15. Indicator device (100) according to claim 3, wherein the indicator device (100) further comprises an ambient light sensor (124), arranged to detect the ambient light intensity and to cause the display means (110) to adapt the intensity of the emitted light signal in response to a change in the ambient light intensity.

16. Indicator device (100) according to claim 3, wherein the indicator device (100) further comprises a light intensity setting device (125), arranged to receive a manual input from a user and to cause the display means (110) to adapt the intensity of the emitted light signal in response to said manual input.

17. Indicator device (100) according to claim 4, wherein the indicator device (100) further comprises a light intensity setting device (125), arranged to receive a manual input from a user and to cause the display means (110) to adapt the intensity of the emitted light signal in response to said manual input.

18. Indicator device (100) according to claim 2, wherein the visible signal in a binary fashion indicates whether or not the measured field strength is below the said certain field strength.

19. Indicator device (100) according to claim 3, wherein the visible signal in a binary fashion indicates whether or not the measured field strength is below the said certain field strength.

20. Indicator device (100) according to claim 4, wherein the visible signal in a binary fashion indicates whether or not the measured field strength is below the said certain field strength.

\* \* \* \* \*